United States Patent
Keyes

(10) Patent No.: US 11,851,281 B2
(45) Date of Patent: Dec. 26, 2023

(54) AUTOMATIC TENSIONING TOOL FOR A BELT OF A PRINTING DEVICE

(71) Applicant: Xerox Corporation, Norwalk, CT (US)

(72) Inventor: Sean R. Keyes, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 16 days.

(21) Appl. No.: 17/644,418

(22) Filed: Dec. 15, 2021

(65) Prior Publication Data
US 2023/0183017 A1 Jun. 15, 2023

(51) Int. Cl.
*B65G 23/44* (2006.01)

(52) U.S. Cl.
CPC .................. *B65G 23/44* (2013.01)

(58) Field of Classification Search
CPC ............ B65B 23/44; B41J 15/00; B41J 15/04
See application file for complete search history.

(56) References Cited

U.S. PATENT DOCUMENTS

| | | | | |
|---|---|---|---|---|
| 2,463,273 A | * | 3/1949 | Holstein | B65G 23/44 198/810.04 |
| 4,185,908 A | * | 1/1980 | Taylor | B65H 5/026 198/813 |
| 9,176,469 B2 | | 11/2015 | Facchini, II et al. | |
| 2005/0113197 A1 | * | 5/2005 | Pong | F16H 7/14 474/133 |
| 2006/0024088 A1 | * | 2/2006 | Atwood | G03G 15/754 399/165 |

FOREIGN PATENT DOCUMENTS

| | | | | |
|---|---|---|---|---|
| CN | 105129318 A | * | 12/2015 | |
| JP | 09100051 A | * | 4/1997 | ............ B65H 18/10 |
| WO | WO-2019221741 A1 | * | 11/2019 | ............ B41J 11/007 |

* cited by examiner

*Primary Examiner* — Gene O Crawford
*Assistant Examiner* — Abby A Jorgensen
(74) *Attorney, Agent, or Firm* — Simpson & Simpson, PLLC

(57) ABSTRACT

A tensioner assembly for a belt of a device useful in printing, the tensioner assembly including a bracket, including a first plate including at least one slot, and a second plate, a third plate slidably connected to the first plate, a connector engaged with the at least one slot and connected to the third plate, and a resilient member including a first end engaged with the third plate and a second end engaged with the second plate, wherein the resilient member is operatively arranged to bias the third plate away from the second plate.

20 Claims, 7 Drawing Sheets

AUTOMATIC TENSIONING TOOL FOR A BELT OF A PRINTING DEVICE

FIELD

The present disclosure relates to printing devices, and more particularly, to a tool that automatically tensions a belt of a printing device.

BACKGROUND

In printing systems, for example production printing systems, cooling systems or devices or modules can be installed, for example as an inline output solution, to dry sheets to improve stacking quality. The cooling device dries coated sheets to prevent sheets from sticking together in the output stacker. Silicone belts used in the cooling module paper path tend to stretch significantly over time. This stretching leads to paper handling issues in which belts can become misaligned and fall off of the rollers. To fix this issue, the belts must be manually tensioned.

Therefore, there is a long felt need for a tool and assembly that automatically re-tensions the belts as they stretch.

SUMMARY

According to aspects illustrated herein, there is provided a tensioner assembly for a belt of a device useful in printing, the tensioner assembly comprising a bracket, including a first plate comprising at least one slot, and a second plate, a third plate slidably connected to the first plate, a connector engaged with the at least one slot and connected to the third plate, and a resilient member including a first end engaged with the third plate and a second end engaged with the second plate, wherein the resilient member is operatively arranged to bias the third plate away from the second plate.

In some embodiments, the third plate comprises a top surface including a recess, a bottom surface, a front surface engaged with the first plate, and a rear surface. In some embodiments, the recess opens to the rear surface. In some embodiments, at least one of the second plate and the third plate comprises a hole, and the resilient member is engaged with the hole. In some embodiments, the resilient member is a spring. In some embodiments, the second plate comprises one or more flanges, wherein the first plate extends from the second plate in a first direction and the one or more flanges extend from the second plate in a second direction, opposite the first direction. In some embodiments, the tensioner assembly further comprises a fourth plate engaged with the third plate. In some embodiments, the fourth plate comprises a flange operatively arranged to engage the top surface, and a hole. In some embodiments, the tensioner assembly further comprises a roller engaged with the belt, wherein the roller is rotatably engaged with the hole. In some embodiments, the tensioner assembly further comprises a drive screw engaged with the flange and the third plate, the drive screw operatively arranged to adjust a force exerted on the third plate by the resilient member.

According to aspects illustrated herein, there is provided a device useful in printing, comprising a frame, a first roller rotatably connected to the frame, a second roller rotatably connected to the frame, a belt engaged with the first roller and the second roller, a tensioner assembly engaged with the first roller, the tensioner assembly comprising a bracket, including a first plate, and a second plate connected to the frame, a third plate slidably connected to the first plate, the third plate engaged with the first roller, a spring including a first end engaged with the third plate and a second end engaged with the second plate, wherein the spring is operatively arranged to apply a force on the third plate away from the second plate.

In some embodiments, the first plate comprises at least one slot, and a clamping connector is engaged with the at least one slot and connected to the third plate. In some embodiments, the third plate comprises a top surface including a recess, a bottom surface, a front surface engaged with the first plate, and a rear surface. In some embodiments, at least one of the second plate and the third plate comprises a hole, and the spring is engaged with the hole. In some embodiments, the frame comprises a flange and the second plate is engaged with the flange. In some embodiments, the second plate comprises one or more flanges, wherein the first plate extends from the second plate in a first direction and the one or more flanges extend from the second plate in a second direction, opposite the first direction. In some embodiments, the device further comprises a fourth plate slidably connected to the frame, and engaged with the third plate and the roller. In some embodiments, the fourth plate comprises a flange operatively arranged to engage the top surface, and a hole, the roller being rotatably engaged with the hole. In some embodiments, the device further comprises a drive screw engaged with the flange and the third plate, the drive screw operatively arranged to adjust a force exerted on the roller by the spring. In some embodiments, the tensioner assembly is operatively arranged to displace the first roller to increase the tension in the belt.

According to aspects illustrated herein, there is provided a removable captured compression spring tool that can be activated to re-tension the transport belts. The tool allows the transport belts to automatically re-tension as they stretch. The tool maintains a consistent tension on the belts to prevent the belts from becoming misaligned or falling off of the rollers.

The automatic tensioning system of the present disclosure allows for consistent tension in the transport belts that cannot currently be maintained with a manual tensioning system. The system compensates for belt stretch while maintaining a consistent tension on the belt to prevent misalignment and belt failure.

According to aspects illustrated herein, there is provided a system that provides dynamic tensioning of belts, for example, in a printing device cooler. The tensioner system allows for re-tensioning of the belt as the age of the belt increases or there is stretching of the belt. Benefits of the tensioner system include that it maintains the proper tension in the belt, especially for belts that may undergo a larger range of stretching due to the thermal variation associated with the cooler.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
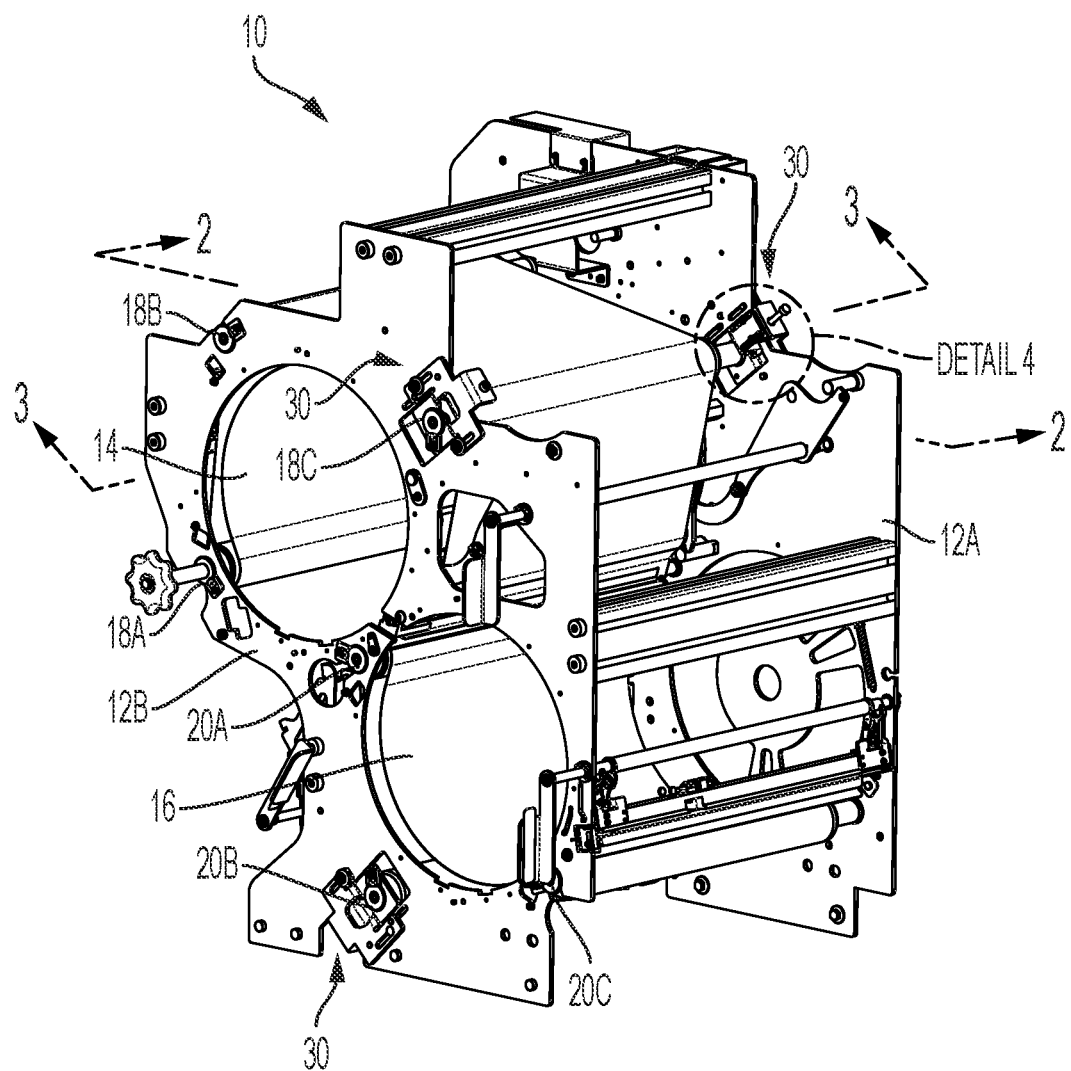
FIG. 1 is a front prospective view of a printing device, in accordance with some embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

"Printer," "printer system," "printing system," "printer device," "printing device," and "multi-functional device (MFD)" as used herein encompass any apparatus, such as a digital copier, bookmaking machine, facsimile machine, multi-function machine, etc., which performs a print outputting function for any purpose. In some embodiments, printing device may also refer to one or more modules of a printer and it's like terms, for example, a cooling module.

As used herein, "sheet," "web," "substrate," "printable substrate," and "media" refer to, for example, paper, transparencies, parchment, film, fabric, plastic, photo-finishing papers, or other coated or non-coated substrate media in the form of a web upon which information or markings can be visualized and/or reproduced. By specialty sheet it is meant a sheet which includes a card, label, sticker, pressure seal envelopes, mailers, or other element that is thicker than the substrate on or in which it resides.

As used herein, "fusing," with respect to dry marking material such as toner, is intended to mean supplying heat energy and/or pressure, having the effect of slightly liquifying the applied dry marking material (toner) particles, in turn causing them to adhere to a surface, to occur in a fusing module. "Drying," as used herein, is intended to mean applying energy, typically but not necessarily heat in radiant and/or convective form, having the effect of causing a liquid component of the ink (a liquid marking material) to evaporate, to occur in a drying module. "Curing," as used herein, for example with respect to IR inks (liquid marking material) is intended to mean applying energy, such as by typically but not necessarily infrared waves, having the effect of causing a chemical reaction within at least one component of the applied ink, thereby fixing the ink to a surface, to occur in a curing module. "Cooling" as used herein, is intended to mean removing heat from a sheet and/or the marking material arranged thereon (e.g., ink).

Figure 2:
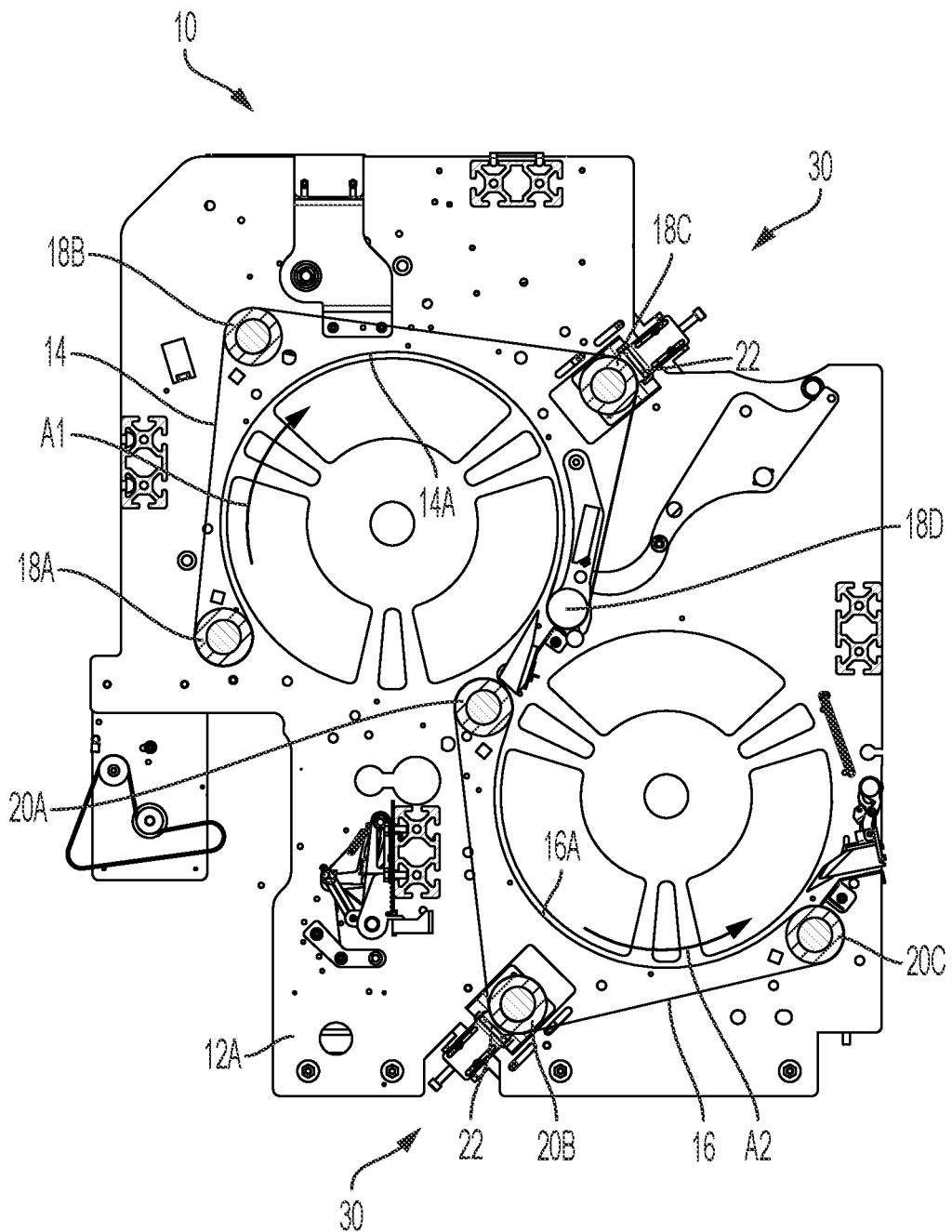
FIG. 2 is a cross-sectional view of the printing device taken generally along line 2-2 in FIG. 1.
Figure 3:
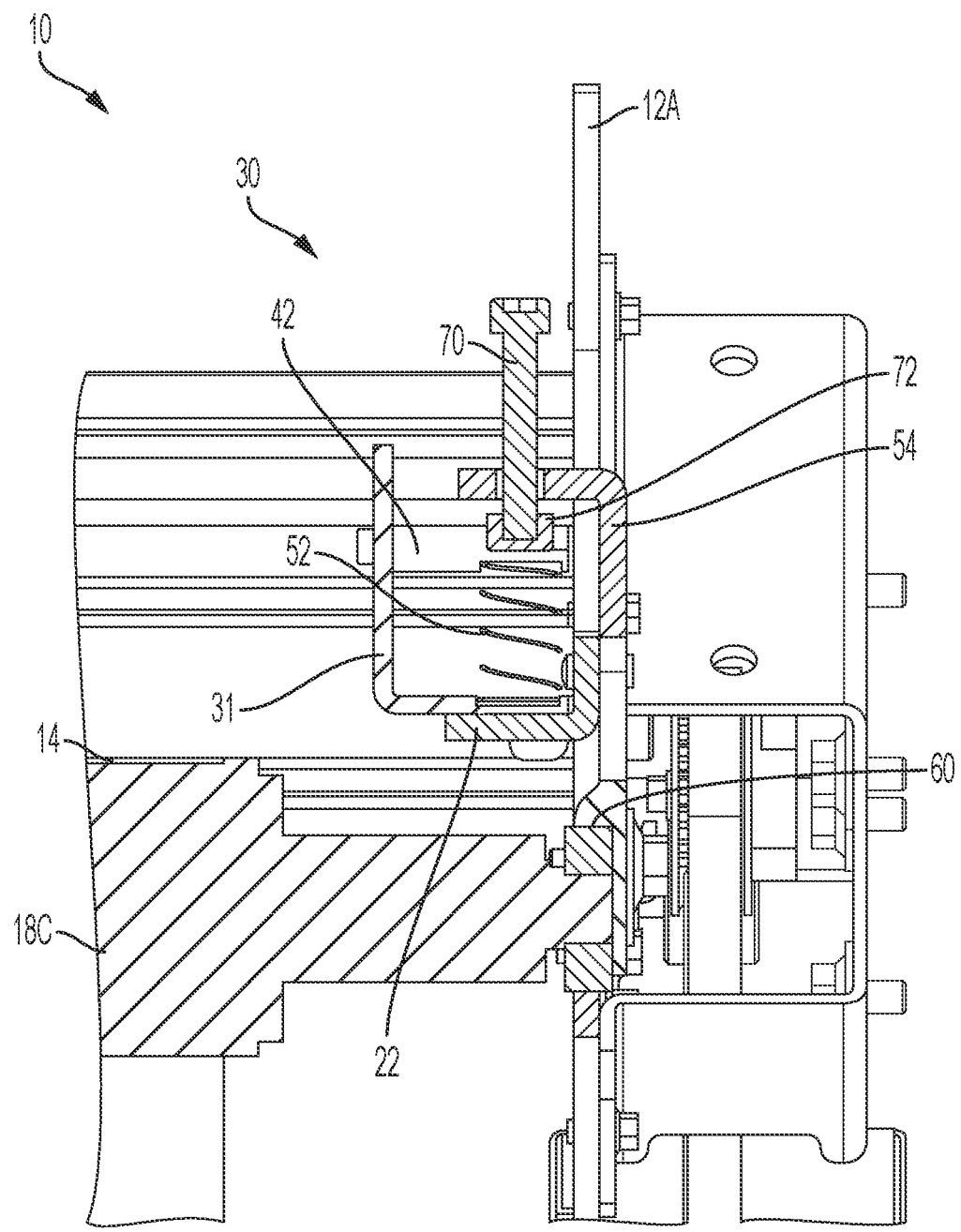
FIG. 3 is a partial cross-sectional view of the printing device taken generally along line 3-3 in FIG. 1.
Figure 4:
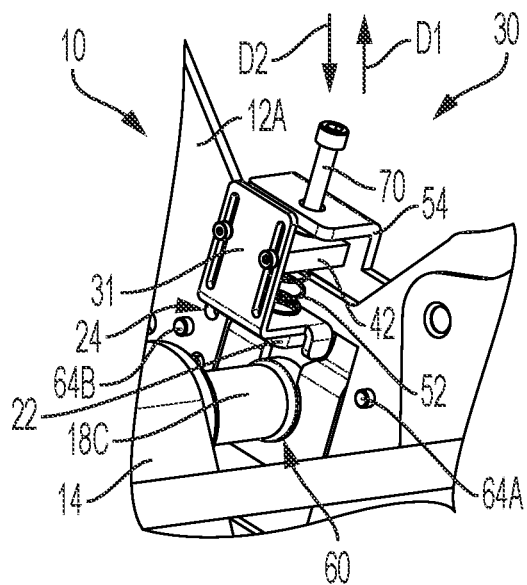
FIG. 4 is a front detail view of the printing device taken generally along Detail 4 in FIG. 1.
Figure 5:
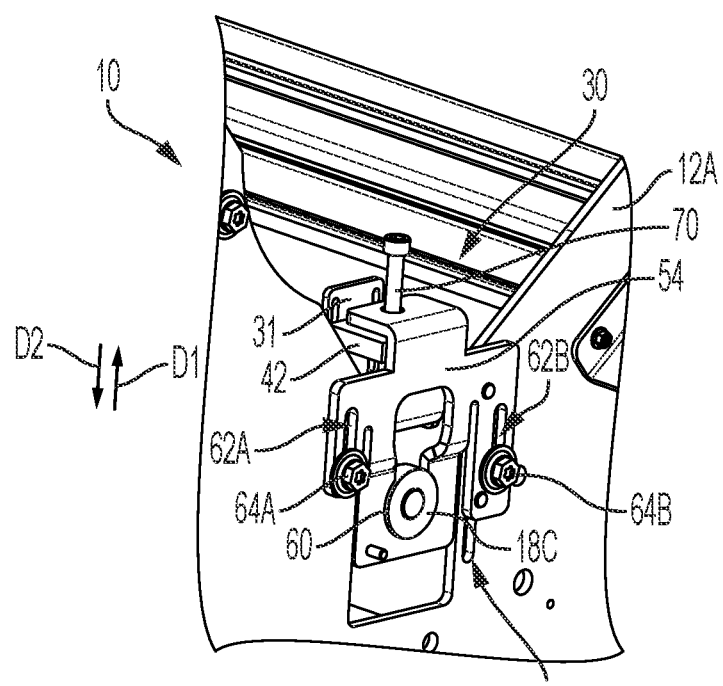
FIG. 5 is a rear partial perspective view of the printing device shown in FIG. 1.

Referring now to the figures, FIG. 1 is a front prospective view of device or device useful for printing or printing device or cooling module 10, in accordance with some embodiments of the present disclosure. FIG. 2 is a cross-sectional view of printing device 10 taken generally along line 2-2 in FIG. 1. FIG. 3 is a partial cross-sectional view of printing device 10 taken generally along line 3-3 in FIG. 1. FIG. 4 is a front detail view of printing device 10 taken generally along Detail 4 in FIG. 1. FIG. 5 is a rear partial perspective view of printing device 10. Printing device 10 may be any module of a printer that comprises a roller, for example, a cooling module, fusing module, drying module, curing module, printing or print head module, feeder, stacker, loop, duplex loop, etc. In some embodiments, printing device 10 is, or is used in, an inkjet printer.

Printing device 10 generally comprises at least one frame, for example frame 12A and frame 12B, at least one belt, for example belt 14 and belt 16, at least one roller operatively arranged to support the at least one belt, and at least one tensioner assembly 30 connected to the at least one roller. For example, printing device 10 may comprise one or more rollers to support belt 14 (e.g., rollers 18A-D) and one or more rollers to support belt 16 (e.g., rollers 20A-C). In some embodiments, in a cooling module, belt 14 comprises radially inward facing surface 14A operatively arranged to engage a cooling drum (not shown) and belt 16A operatively arranged to engage a cooling drum (not shown). A sheet is arranged to ride along the outer surface of belts 14 and 16 to engage the cooling drums. In some embodiments, at least one of belt 14 and belt 16 is a silicone seamless belt.

At least one roller of rollers 18A-D comprises tensioner 30, for example, idler roller 18C. Similarly, at least one roller of rollers 20A-C comprises tensioner 30, for example, idler roller 20B. Tensioner 30 is operatively arranged to apply a constant tension force to belt 14, 16 such that a proper tension in belt 14, 16 is maintained. In some embodiments, each of rollers 18A-D and 20A-C are rotatably connected on either side to frames 12A-B. In some embodiments, at least one roller of rollers 18A-D is a drive roller and at least one roller of rollers 20A-C is a drive roller. In some embodiments, at least one roller of rollers 18A-D is an idler roller and at least one roller of rollers 20A-C is an idler roller. In some embodiments, at least one of frame 12A and frame 12B comprises flange 22. In some embodiments, rollers 18A-D drive belt 14 in a counterclockwise direction as indicated by arrow A1 in FIG. 2. In some embodiments, rollers 20A-C drive belt 16 in a clockwise direction as indicated by arrow A2 in FIG. 2.

Figure 6A:
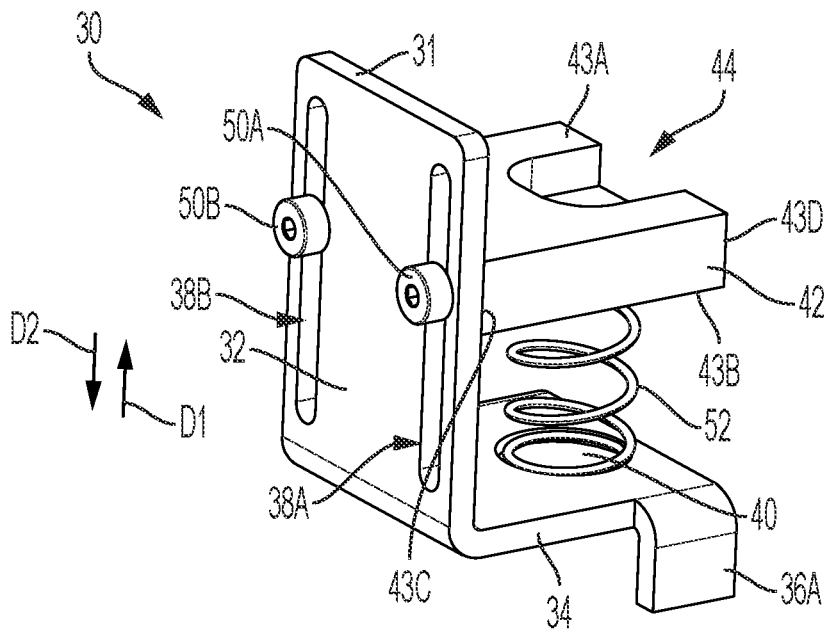
FIG. 6A is a front perspective view of a tensioner assembly.
Figure 6B:
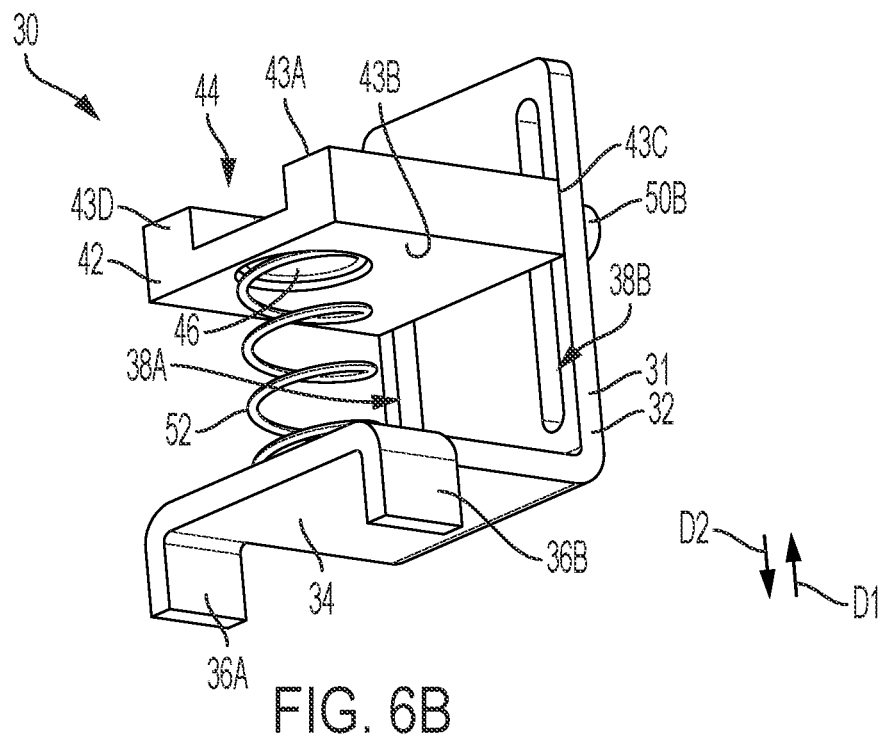
FIG. 6B is a rear perspective view of the tensioner assembly shown in FIG. 6.
Figure 7:
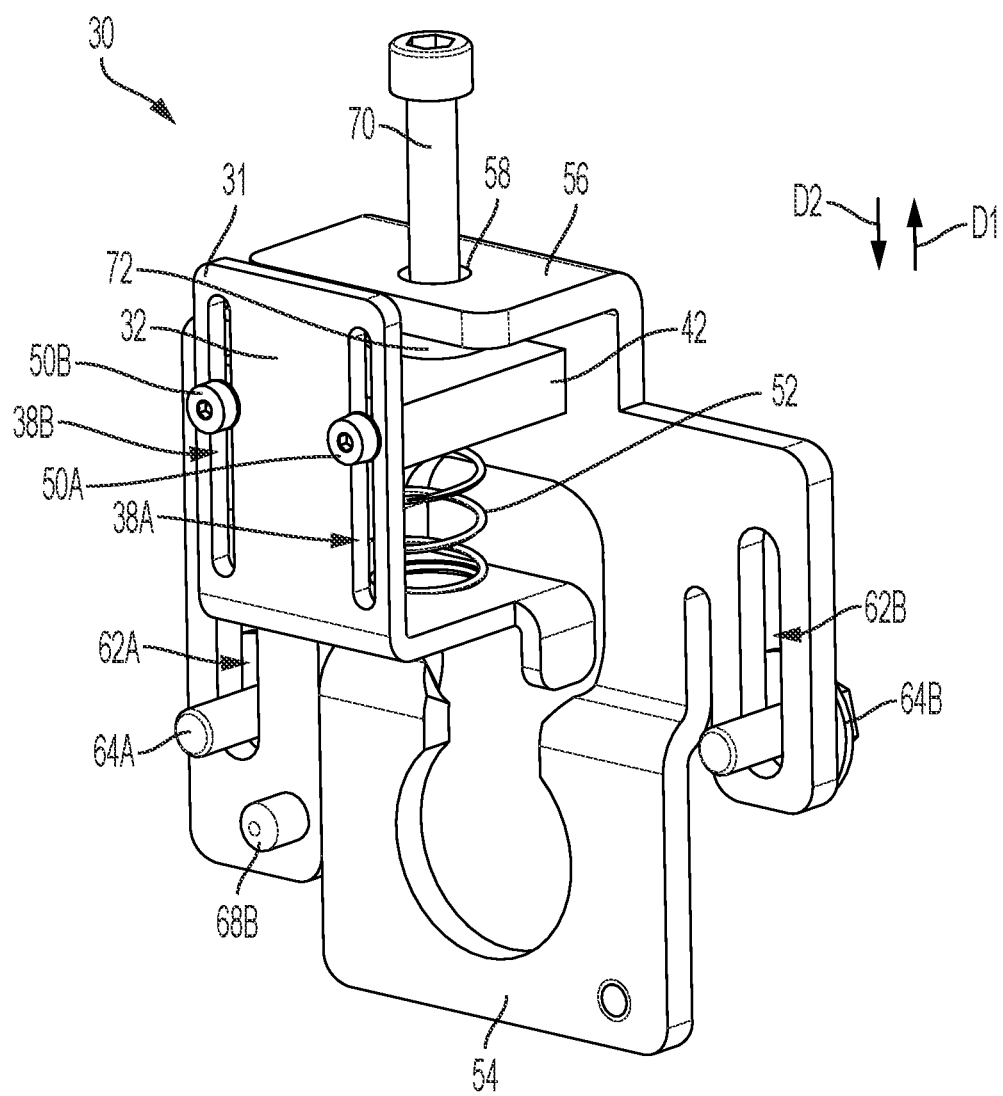
FIG. 7 is a front perspective view of a tensioner assembly.
Figure 8:
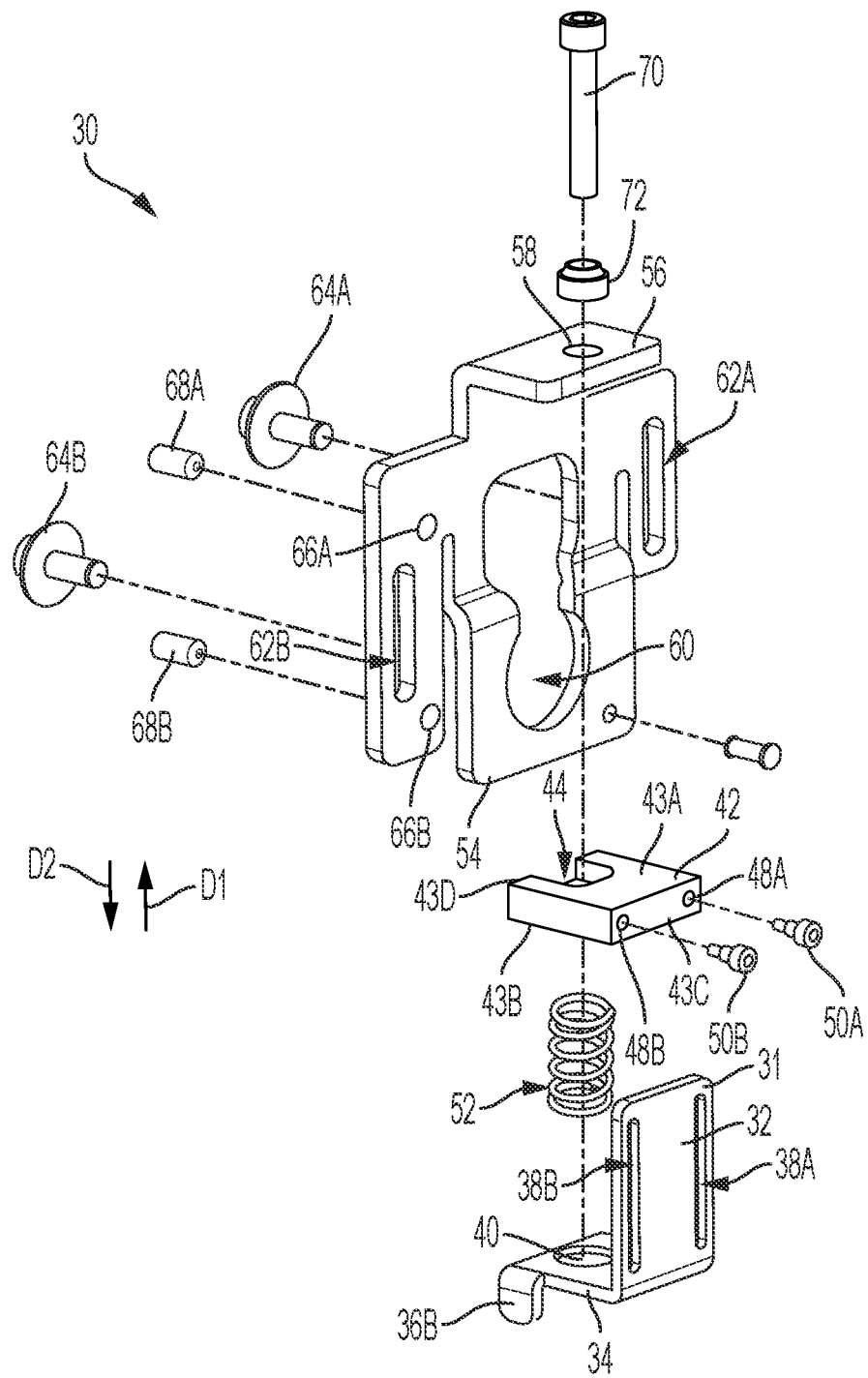
FIG. 8 is an exploded perspective view of the tensioner assembly shown in FIG. 7.

FIG. 6A is a front perspective view of tensioner assembly 30. FIG. 6B is a rear perspective view of tensioner assembly 30. FIG. 7 is a front perspective view of tensioner assembly 30. FIG. 8 is an exploded perspective view of tensioner assembly 30. In some embodiments, tensioner assembly 30 comprises bracket 31, plate 42, and resilient device 52. In some embodiments, and as shown in FIGS. 7-8, tensioner assembly 30 further comprises bracket 54 and one or more connectors. In some embodiments, tensioner assembly 30 further comprises drive screw 70. In some embodiments, at least one roller on each belt comprises tensioner assembly 30 on either end thereof so as to provide the same tension force on both ends of the roller. The following description should be read in view of FIGS. 1-8.

Bracket 31 comprises plate 32 and plate 34 connected to plate 32. In some embodiments, plate 34 is arranged perpendicular to plate 32. In some embodiments, plate 34 is arranged non-perpendicular to plate 32. Plate 32 comprises at least one slot, for example, slot 38A and slot 38B. In some embodiments, slot 38B is arranged parallel to and spaced apart from slot 38A. Slots 38A-B are operatively arranged to slidingly engage connectors 50A-B, as will be described in greater detail below.

Plate 32 is operatively arranged to engage frame 12A (or frame 12B) and resilient member 52. For example, in some embodiments, the bottom surface of plate 32 engages flange 22 and the top surface of plate 32 engages resilient member 52. In some embodiments, plate 32 comprises one or more flanges extending from the bottom surface thereof, for example flanges 36A-B. Flanges 36A-B are operatively arranged to engage flange 22 to maintain tensioner assembly 30 in engagement with frame 12A. For example, flange 36A engages a first side of flange 22 and flange 36B engages a second side of flange 22, opposite the first side of flange 22, thus preventing lateral displacement of plate 34 with respect to flange 22. In some embodiments, instead of or in addition to flanges 36A-B, plate 34 can be connected to flange 22 or frame 12A via any suitable means, for example, screws, bolts, adhesives, soldering, welding, nails, pins, rivets, etc.

In some embodiments, the top surface of plate 34 comprises hole 40 operatively arranged to engage a first end of resilient member 52. In some embodiments, resilient member 52 is a spring. It should be appreciated that resilient member 52 may comprise any resilient member suitable to bias plate 42 in direction D1 with respect to plate 34 may be used, for example, a piston, balloon, cellular matrix (e.g., sponge, foam, etc.). The engagement of resilient member 52 with hole 40 prevents displacement of resilient member 52 with respect to plate 34. In some embodiments, tensioner assembly 30 comprises a plurality of resilient members arranged between plate 34 and plate 42.

Plate 42 is slidably connected to bracket 31, specifically plate 32, and comprises top surface 43A, bottom surface 43B, front surface 43C, and rear surface 43D. Plate 42 is operatively arranged to engage a roller, for example roller 18C, as will be described in greater detail below. Top surface 43A faces away from plate 34. In some embodiments, top surface comprises recess 44 operatively arranged to engage drive screw 70. In some embodiments, recess 44 opens to rear surface 43D. Bottom surface 43B faces toward plate 34. In some embodiments, and as best shown in FIG. 6B, bottom surface 43B comprises hole 46 operatively arranged to engage a second end of resilient member 52. The engagement of resilient member 52 with hole 46 prevents displacement of resilient member 52 with respect to plate 42. Front surface 43C is operatively arranged to slidingly engage plate 32. For example, in some embodiments, front surface 43 comprises at least one hole (e.g., holes 48A-B shown in FIG. 8). Connectors 50A-B are arranged to extend through slots 38A-B and threadably engage holes 48A-B to slidably connect plate 42 to plate 32. In some embodiments, connectors 50A-B can be tightened within holes 48A-B to increase friction between plate 42 and plate 32, or to fixedly secure/clamp plate 42 to plate 32.

Plate or bracket 54 is operatively arranged to connect plate 42 to the roller. Specifically, plate 54 comprises flange 56 arranged to engage plate 42 and hole 60 arranged to engage roller 18C. In some embodiments, flange 56 is arranged perpendicular to plate 54. In some embodiments, flange 56 is arranged non-perpendicular to plate 54. In some embodiments, flange 54 comprises hole 58. Drive screw 70 is operatively arranged to engage hole 58. For example, drive screw 70 is threadably engaged with hole 58 and a distal end thereof engages plate 42, specifically, recess 44. As drive screw 70 is rotated in a first circumferential direction the distal end of drive screw 70 is displaced in direction D2, toward plate 34, thereby adding tension to roller 18C and belt 14. As drive screw 70 is rotated in a second circumferential direction, opposite the first circumferential direction, the distal end of drive screw 70 is displaced in direction D1, away from plate 34, thereby removing tension to roller 18C and belt 14. Thus, drive screw 70 operates to add and remove tension from roller 18C and belt 14. Put another way, by displacing roller 18C in direction D1, tension is added to belt 14, and by displacing roller 18C in direction D2, tension is removed from belt 14. In some embodiments, drive screw 70 further comprises cap or spacer 72 arranged on its distal end. Cap 72 facilitates better engagement between drive screw 70 and plate 42.

Roller 18C is rotatably engaged with hole 60. In some embodiments, hole 60 is key shaped. Once roller 18C is engaged with hole 60, plate 42 maintains a force on roller 18C in direction D1 via resilient member 52. Plate 54 further comprises at least one slot, for example slots 62A-B, operatively arranged to slidingly connect plate 54 with frame 12A. As best shown in FIG. 5, connectors 64A-B extend through slots 62A-B and threadably engage with frame 12A. Thus, plate 54 is slidable with respect to frame 12A and connectors 64A-B. Connectors 64A-B may be any connector suitable to slidably connect plate 54 with frame 12A, for example, bolts, screws, pins, nails, dowels, etc. Connectors 68A-B are arranged to provide further slidable securement between plate 54 and frame 12A, namely, to maintain alignment and to prevent rotation of plate 54 with respect to frame 12A. Connectors 68A-B extend through holes 66A-B of plate 54 and engage slot 24 of frame 12A, as shown in FIGS. 4-5. The engagement of connectors 64A-B with slot 24 maintain displacement only in directions D1 and D2, and prevent rotational displacement of plate 54. Connectors 68A-B may be any connector suitable to maintain alignment and prevent rotational displacement of plate 54 with respect to frame 12A, for example, bolts, screws, pins, nails, dowels, etc.

To assembly tensioner assembly 30, plate 54 is slidably connected to frame 12A, as previously indicated using connectors 64A-B and 68A-B. Such connection allows plate 54 to displace only in direction D1 and direction D2 with respect to frame and generally prevents any other type of displacement. In some embodiments, drive screw 70 is threadably engaged with hole 58. In some embodiments, cap 72 is arranged on the distal end of drive screw 70 under flange 56 (i.e., on the side of flange 56 facing flange 22). Plate 42 is connected to bracket 31. Specifically, with top surface 43A facing away from plate 34, front surface 43C is engaged with plate 32 such that holes 48A-B are aligned with slots 38A-B. Connectors 50A-B are then fed through slots 38A-B and engaged with holes 48A-B, thereby slidably connecting plate 42 with plate 32. Resilient member 52 is arranged between plate 42 and plate 34. In some embodiments, resilient member 52 engages holes 40 and 46. Bracket 31 is connected to frame 12A. Specifically, plate 34 is engaged with flange 22 such that flanges 36A-B are arranged on either side of flange 22. Plate 42 is engaged with drive screw 70. In some embodiments, drive screw 70 and/or cap 72 engages recess 44. In some embodiments, when assembling bracket 31 and plate 42 onto frame 12A, plate 42 is displaced toward plate 34 thereby compressing resilient member 52, at which point connectors 50A-B are tightened to clamp plate 42 to plate 32. Then bracket 31 is arranged on flange 22 as previously described and screws 50A-B are loosened, at which point plate 42 displaces in direction D1 and engages drive screw 70, cap 72, and/or flange 56.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Device or device useful for printing or printing device or cooling module
12A Frame
12B Frame
14 Belt
14A Radially inward facing surface
16 Belt
16A Radially inward facing surface
18A Roller
18B Roller
18C Roller
18D Roller
20A Roller
20B Roller
20C Roller
22 Flange
24 Slot
30 Tensioner assembly
31 Bracket
32 Plate
34 Plate
36A Flange
36B Flange
38A Slot
38B Slot
40 Hole
42 Plate
43A Surface
43B Surface
43C Surface
43D Surface
44 Recess
46 Hole
48A Hole
48B Hole
50A Connector
50B Connector
52 Resilient device or spring
54 Plate or bracket
56 Flange
58 Hole
60 Hole
62A Slot
62B Slot
64A Connector
64B Connector
66A Hole
66B Hole
68A Connector
68B Connector
70 Drive screw
72 Cap or spacer
A1 Arrow
A2 Arrow
D1 Direction
D2 Direction

What is claimed is:
1. A tensioner assembly for a belt of a device useful in printing, the tensioner assembly comprising:
a bracket, including:
a first plate comprising at least one slot extending in a linear direction along a portion of the first plate; and,
a second plate extending from the first plate;
a third plate adjustably slidingly secured to the first plate;
a connector adjustably slidably connecting the first plate to the third plate, a first end of the connector slidably received within the at least one slot, and a second end of the connector secured to the third plate, the first end of the connector configured for sliding linear engaging movement along a length of the at least one slot; and, a resilient member including a first end engaged with the third plate and a second end engaged with the second plate;

wherein the resilient member is operatively arranged to bias the third plate away from the second plate.

2. The tensioner assembly as recited in claim 1, wherein the third plate comprises:
a top surface including a recessed portion;
a bottom surface;
a front surface that slidably engages with the first plate; and,
a rear surface.

3. The tensioner assembly as recited in claim 2, wherein the recessed portion extends from the rear surface and toward the front surface.

4. The tensioner assembly as recited in claim 1, wherein at least one of the second plate and the third plate comprises a recessed portion, and an end of the resilient member is received in and engages with the recessed portion.

5. The tensioner assembly as recited in claim 1, wherein the resilient member is a spring.

6. The tensioner assembly as recited in claim 1, wherein the second plate comprises one or more flanges, wherein the first plate extends from the second plate in a first direction and the one or more flanges extend from the second plate in a second direction, opposite the first direction.

7. The tensioner assembly as recited in claim 2, further comprising a second bracket engaged with the third plate.

8. The tensioner assembly as recited in claim 7, wherein the second bracket comprises:
a flange operatively arranged to engage the top surface of the third plate; and,
an aperture receiving a roller therein.

9. The tensioner assembly as recited in claim 8, wherein the roller is rotatably engaged with the aperture and a belt.

10. The tensioner assembly as recited in claim 8, further comprising a drive screw engaged with the flange and the third plate, the drive screw operatively arranged to adjust a force exerted on the third plate by the resilient member.

11. A device useful in printing, comprising:
a frame;
a first roller rotatably connected to the frame;
a second roller rotatably connected to the frame;
a belt engaged with the first roller and the second roller;
a tensioner assembly engaged with the first roller, the tensioner assembly comprising:
a first bracket, including:
a first plate comprising at least one slot extending in a linear direction along a portion of the first plate; and,
a second plate extending from the first plate and connected to the frame;
a third plate adjustably slidingly secured to the first plate, the third plate engaging a second bracket receiving the first roller;
a connector adjustably slidably connecting the first plate to the third plate, a first end of the connector slidably received within the at least one slot, and a second end of the connector secured to the third plate, the first end of the connector configured for sliding linear engaging movement along a length of the at least one slot; and,
a spring including a first end engaged with the third plate and a second end engaged with the second plate;
wherein the spring is operatively arranged to apply a force on the third plate away from the second plate.

12. The device as recited in claim 11, wherein:
the first plate comprises at least two slots; and,
a pair of connectors adjustably slidably connect the first plate to the third plate.

13. The device as recited in claim 11, wherein the third plate comprises:
a top surface including a recessed portion;
a bottom surface;
a front surface that slidably engages with the first plate; and,
a rear surface.

14. The device as recited in claim 11, wherein at least one of the second plate and the third plate comprises a recessed portion, and an end of the spring is received in and engages with the recessed portion.

15. The device as recited in claim 11, wherein the frame comprises a flange and the second plate is engaged with the flange.

16. The device as recited in claim 11, wherein the second plate comprises one or more flanges, wherein the first plate extends from the second plate in a first direction and the one or more flanges extend from the second plate in a second direction, opposite the first direction.

17. The device as recited in claim 13, wherein a second bracket comprises a fourth plate slidably connected to the frame; and,
wherein the second bracket engages the third plate and the first roller.

18. The device as recited in claim 17, wherein the second bracket comprises:
a flange operatively arranged to engage the top surface of the third plate; and,
an aperture, the first roller being rotatably engaged with the aperture.

19. The device as recited in claim 18, further comprising a drive screw engaged with the flange of the second bracket and the third plate, the drive screw operatively arranged to adjust a force exerted on the first roller by the spring.

20. The device as recited in claim 11, wherein the tensioner assembly is operatively arranged to displace the first roller to increase tension in the belt.

\* \* \* \* \*